E. LUND.
RAKE.
APPLICATION FILED FEB. 19, 1915.
1,159,970. Patented Nov. 9, 1915.
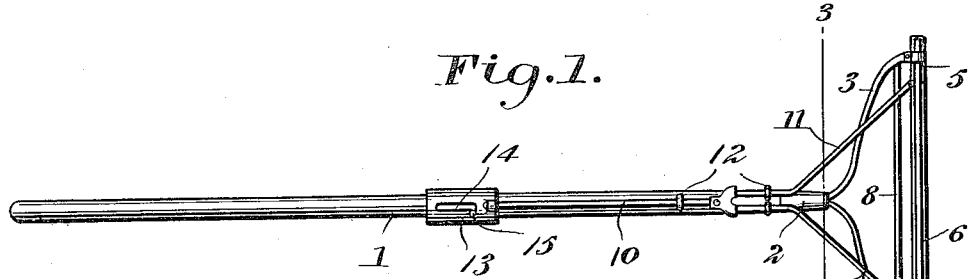
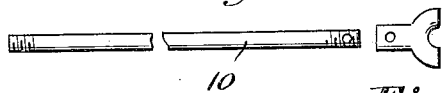
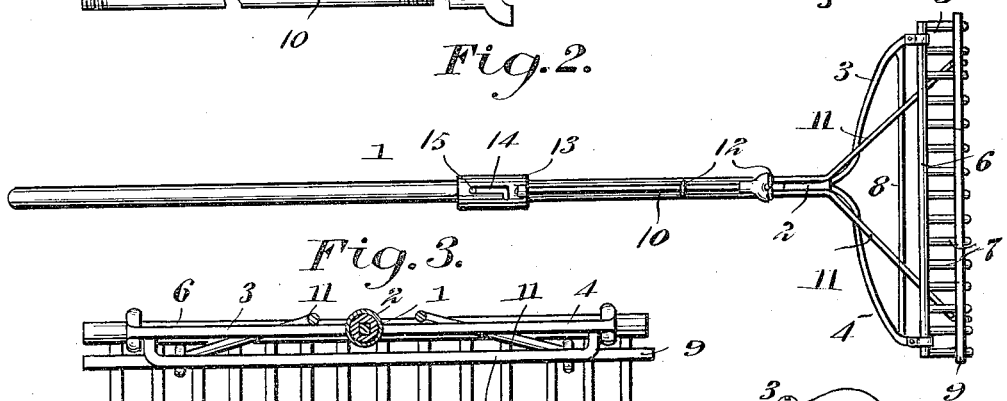
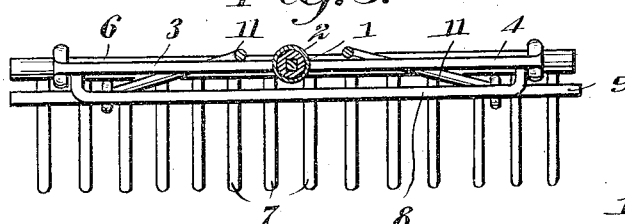
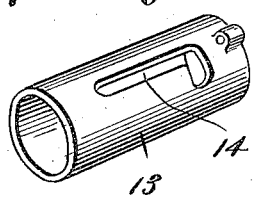
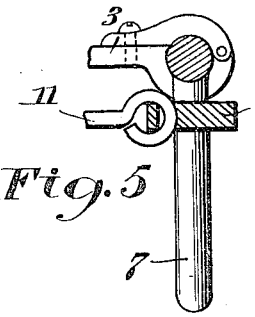
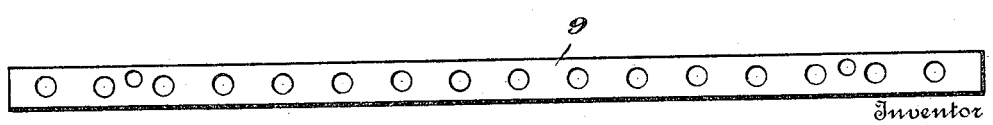
Witnesses
Frederick W. Ely.
Wm Rudger Smith
Inventor
Edward Lund,
By Victor J. Evans
Attorney

UNITED STATES PATENT OFFICE.

EDWARD LUND, OF OGDEN, UTAH.

RAKE.

1,159,970.     Specification of Letters Patent.     Patented Nov. 9, 1915.

Application filed February 19, 1915. Serial No. 9,380.

*To all whom it may concern:*

Be it known that I, EDWARD LUND, a citizen of the United States, residing at Ogden, in the county of Weber and State of Utah, have invented new and useful Improvements in Rakes, of which the following is a specification.

This invention relates to improvements in rakes and has for its primary object the provision of a structure wherein the position of the main parts of the rake can be changed so as to remove all accumulations between the teeth of the head of the rake.

Another object of the invention is to so pivot the toothed head of the rake that upon reciprocatory motion of the slidably mounted rod, the toothed head can be thrown to position whereby upon final movement of the reciprocating rod, the teeth of the head will be relieved of all accumulations.

A still further object of the invention is the provision of a structure wherein means is provided for preventing relative movement of the parts of the rake when the latter is doing work.

The invention consists in the features of construction, combination, and arrangement of parts, hereinafter fully described and claimed, reference being had to the accompanying drawing, in which:—

Figure 1 is a top plan view of a rake showing the parts in one position. Fig. 2 is a similar view showing the parts in another position. Fig. 3 is a section on line 3—3 of Fig. 1. Figs. 4, 5, and 6, are detail views. Fig. 7 is a detail view of the rod.

In the drawings, the numeral 1 designates a handle having one of its ends provided with a ferrule 2 in which fits the adjacent extremity of bowed rods 3 and 4. These rods have their free extremities formed into eyes in which rotate portions 5 of a bar 6 forming a portion of the rake head. This bar 6 is provided with the usual spaced teeth 7.

Bridging the distance between the intermediate portions of the rods 3 and 4 and secured thereto, is a brace 8. Slidably mounted upon the teeth 7 is a bar 9 whereby the foreign matter which accumulates upon the teeth will be readily removed upon reciprocating the bar. For reciprocating the bar upon the teeth, I provide a cylindrical rod 10 having screw-threaded engagement at one extremity with outwardly diverging limbs 11 which have their free extremities formed into eyes which loosely engage the bar 9. The cylindrical rod 10 and limbs 11 are slidably mounted in eye bolts 12 secured to the handle.

Slidably mounted upon the handle and secured to the free extremity of the cylindrical rod is a sleeve 13 provided with a bayonet slot 14 that coöperates with a pin 15 projecting laterally from the handle, thus the slidable motion of the sleeve is limited. From this arrangement, it will be seen that when the pin is in the short passage of the bayonet slot, the cylindrical rod, head of the rake, and the bar 9 are held against movement. If it is found necessary to remove the accumulation between the teeth, all that is necessary is to rotate the sleeve slightly and slide it forwardly on the handle. This action causes the rake head to rotate in the eyes formed on the rods 3 and 4 so as to take up approximately a horizontal position and at the same time slide the bar 9 upon the teeth.

Having described my invention, what I claim is:

A rake comprising in combination, a handle, a toothed head hinged thereto, a bar slidably mounted upon the teeth of said head, a sleeve slidably mounted on said handle and limited in its movement, a cylindrical rod having one extremity secured to said sleeve and its remaining extremity having a hinge connection with said bar.

In testimony whereof I affix my signature in presence of two witnesses.

EDWARD LUND.

Witnesses:
     DAVID JENSON,
     LEO A. HARRIS.

Copies of this patent may be obtained for five cents each, by addressing the "Commissioner of Patents, Washington, D. C."